(12) United States Patent
Ozeki

(10) Patent No.: US 11,602,876 B2
(45) Date of Patent: Mar. 14, 2023

(54) MACHINE LEARNING DEVICE AND DESIGN SUPPORT DEVICE

(71) Applicant: FANUC CORPORATION, Yamanashi (JP)

(72) Inventor: Shinichi Ozeki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 375 days.

(21) Appl. No.: 16/883,054

(22) Filed: May 26, 2020

(65) Prior Publication Data

US 2020/0391414 A1 Dec. 17, 2020

(30) Foreign Application Priority Data

Jun. 11, 2019 (JP) .............................. JP2019-108902

(51) Int. Cl.
*G06F 30/17* (2020.01)
*G06N 20/00* (2019.01)
*B29C 33/38* (2006.01)
*G06F 113/22* (2020.01)

(52) U.S. Cl.
CPC .......... *B29C 33/3835* (2013.01); *G06F 30/17* (2020.01); *G06N 20/00* (2019.01); *G06F 2113/22* (2020.01)

(58) Field of Classification Search
None
See application file for complete search history.

(56) References Cited

U.S. PATENT DOCUMENTS

| 2020/0101649 A1* | 4/2020 | Okubo | ................ | G05B 19/406 |
| 2021/0004693 A1* | 1/2021 | Joglekar | ................. | G06N 5/04 |

FOREIGN PATENT DOCUMENTS

| JP | 5-309711 | 11/1993 |
| JP | 2007-83602 | 4/2007 |
| JP | 2008-110486 | 5/2008 |
| JP | 2009-233881 | 10/2009 |

* cited by examiner

*Primary Examiner* — Tapas Mazumder
(74) *Attorney, Agent, or Firm* — Wenderoth, Lind & Ponack, L.L.P.

(57) ABSTRACT

A molding shrinkage ratio is predicted according to molding conditions set in advance in designing a mold. A machine learning device includes an input data acquiring unit that acquires input data including any molding condition including a type of resin, a type of additive, a blending ratio of the additive, a surface temperature of a mold, and a product of a holding pressure and a holding pressure time for any article molded by any injection molding machine, a label acquiring unit that acquires label data indicating a molding shrinkage ratio in a flow direction and a molding shrinkage ratio in a vertical direction perpendicular to the flow direction of a resin measured of the article molded at the molding condition, and a learning unit that executes supervised learning using the input data and the label data, and generates a learned model.

4 Claims, 5 Drawing Sheets

MACHINE LEARNING DEVICE AND DESIGN SUPPORT DEVICE

This application is based on and claims the benefit of priority from Japanese Patent Application No. 2019-108902, filed on 11 Jun. 2019, the content of which is incorporated herein by reference.

BACKGROUND OF THE INVENTION

Field of the Invention

The present invention relates to a machine learning device and a design support device.

Related Art

A resin product composed of plastic or the like (hereinafter, also referred to as "molded article") is, for example, molded by an injection molding machine which injects the resin into a mold. In other words, designing the mold makes it possible to manufacture molded articles of various desired shapes.

In the design of the mold, a dissolved resin is poured into the mold (cavity) and cooled, following by the resin being taken out from the mold as a molded article; however, in consideration of molding shrinkage in which the volume of the resin is reduced by the cooling, it is necessary to design the size of the mold (cavity) larger than the size of an article to be molded. For example, ABS (acrylonitrile butadiene styrene) has the molding shrinkage ratio of 4/1000 to 9/1000, and thus shrinks by 4 mm to 9 mm from the entire length of 1000 mm.

Furthermore, the molding shrinkage ratio differs between the flow direction in which a dissolved resin flows in the mold and the vertical direction perpendicular to the flow direction. That is, the molding shrinkage ratio decreases in the flow direction, while the molding shrinkage ratio increases in the vertical direction.

In addition, the molding shrinkage ratio also varies greatly depending on additives such as glass fibers added to the resin. For example, in a case in which 30% glass fibers are blended in polyphenylene sulfide (PPS), the molding shrinkage ratio in the flow direction is 0.3% to 0.4%, and the molding shrinkage ratio in the vertical direction is 0.6% to 0.7%. Furthermore, in a case in which 40% of glass fibers are blended in the liquid crystal polymer (LCP), the molding shrinkage ratio in the flow direction is 0.1% to 0.15%, and the molding shrinkage ratio in the vertical direction is 0.3% to 0.5%. That is, the molding shrinkage ratio in the vertical direction is about two to three times larger than the molding shrinkage ratio in the flow direction.

In addition, in the resin in which the glass fiber is blended, the molding shrinkage ratio is not uniformly generated in all directions, and depends greatly on the flow direction. This is considered to be caused by the orientation produced when the resin is poured into the mold, and the molecules of the resin and the glass fibers are aligned in a certain direction.

In view of the above, a technique has been known of calculating the distribution of the volume shrinkage of a molded article by the flow analysis and the distribution of the degree of birefringence by residual stress analysis, measuring the relationship between the degree of birefringence and the molding shrinkage anisotropy, and applying the volume shrinkage ratio to the molding shrinkage ratio in the flow direction and the vertical direction in accordance with the measured shrinkage anisotropy according to the distribution of the degree of birefringence, thereby predicting the molding shrinkage amount and the distribution of the shrinkage direction of the molded article. For example, see Patent Document 1.

Patent Document 1: Japanese Unexamined Patent Application, Publication No. 2007-83602

SUMMARY OF THE INVENTION

However, in the prior art, the factors of the type of resin, the type of additive to be blended in the resin, and the blending ratio are not considered, and it may be difficult to calculate a strict molding shrinkage ratio. Furthermore, in designing the mold, it is difficult to set in advance molding conditions of a molded article, and the molding shrinkage ratio between the flow direction and the vertical direction, and thus, some experience is required of the operator. Therefore, in designing the mold, procedures such as trial manufacture of the mold, trial injection using a manufactured mold, size measurement of an injected molded article in the trial, and redesigning of the mold (or adjustment of the molding conditions) are repeatedly performed. Therefore, there is a problem in that the cost increases as the number of trials for manufacturing the mold increases.

Therefore, in designing the mold, it is desirable to predict the molding shrinkage ratio according to molding conditions set in advance.

(1) According to an aspect of the present disclosure, a machine learning device includes: an input data acquiring unit that acquires input data including any molding condition including at least a type of resin, a type of additive, a blending ratio of the additive, a surface temperature of a mold, and a product of a holding pressure and a holding pressure time for any article molded by any injection molding machine; a label acquiring unit that acquires label data indicating a molding shrinkage ratio in a flow direction and a molding shrinkage ratio in a vertical direction perpendicular to the flow direction of a resin measured of the article molded at the molding condition included in the input data; and a learning unit that executes supervised learning using the input data acquired by the input data acquiring unit and the label data acquired by the label acquiring unit, and generates a learned model.

(2) According to an aspect of the present disclosure, a design support device includes: a learned model generated by a machine learning device according to (1) above; an input unit that inputs a molding condition set in advance; and a prediction unit that inputs the molding condition inputted by the input unit to the learned model, and predicts a molding shrinkage ratio in the flow direction and a molding shrinkage ratio in the vertical direction at the molding condition.

According to one aspect, in the design of the mold, it is possible to predict the molding shrinkage ratio according to the molding conditions set in advance.

DETAILED DESCRIPTION OF THE INVENTION

Hereinafter, a description will be given of an embodiment of the present disclosure with reference to the drawings.

Embodiment

Figure 1:
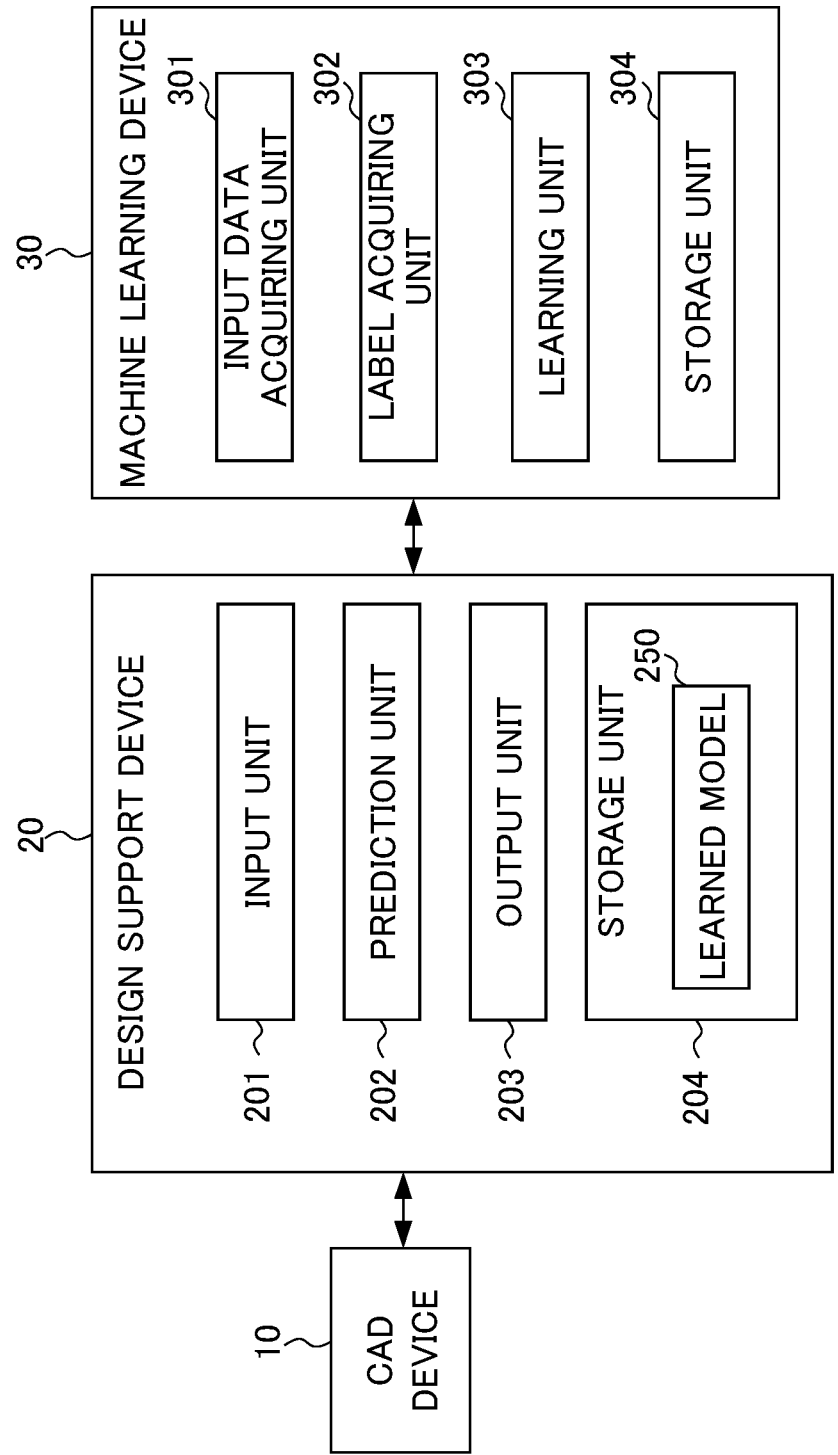
FIG. 1 is a functional block diagram showing a functional configuration example of a design support system according to an embodiment.

FIG. 1 is a functional block diagram showing a functional configuration example of a design support system according to an embodiment. As shown in FIG. 1, a design support system includes a CAD (Computer-Aided Design) device 10, a design support device 20, and a machine learning device 30.

The CAD device 10, the design support device 20, and the machine learning device 30 may be directly connected to each other via a connection interface (not shown). Furthermore, the CAD device 10, the design support device 20, and the machine learning device 30 may be connected to each other via a network (not shown) such as a LAN (Local Area Network) or the Internet. In this instance, the CAD device 10, the design support device 20, and the machine learning device 30 comprise a communication unit (not shown) for communicating with each other by such connections. As will be described later, the CAD device 10 may include the design support device 20 and the machine learning device 30.

The CAD device 10 operates CAD software for drawing on the screen of a computer using a CPU (Central Processing Unit). Furthermore, the CAD device 10 draws (designs) a mold for molding an article to be molded on the basis of the CAD data of a molded article which is designed in advance, molding conditions set in advance, and the molding shrinkage ratios in the flow direction and the vertical direction of a resin predicted with the molding conditions by the design support device 20 to be described later. Drawing of the mold is carried out using two-dimensional CAD or three-dimensional CAD. In the case of using two-dimensional CAD, a front view, a top view, a side view, etc. of the mold are drawn on the plane of X and Y. In the case of using three-dimensional CAD, a three-dimensional image of the mold is drawn in the three-dimensional space of X, Y and Z.

The design support device 20 may acquire from the CAD device 10 the molding conditions set in advance in designing the mold by the CAD device 10 in the operation phase. The design support device 20 can predict the molding shrinkage ratios in the flow direction and the vertical direction by inputting the acquired molding conditions into a learned model provided from the machine learning device 30, which will be described later.

It should be noted that the molding conditions include at least the type of resin (material) (thermosetting resin such as epoxy resin or polyurethane resin, thermoplastic resin such as polyester or polyvinyl chloride), the type of additive (glass fiber, stabilizer, coloring agent, etc.), the blending ratio of the additive, the surface temperature of the mold, and the product of the holding pressure and the holding pressure time. All of the molding conditions have a large influence on the molding shrinkage ratio.

Hereinafter, brief descriptions will be given of the relationship between the molding shrinkage ratio and each type of resin, the type of additive, the blending ratio of the additive, the surface temperature of the mold, and the product of the holding pressure and the holding pressure time included in the molding conditions.

(1) Type of resin (material): the basic shrinkage range is determined by the material type of the resin. However, there is a slight difference in shrinkage depending on a resin manufacturer, a resin grade, or the like.

(2) Type of additive and blending ratio of additive: in a resin in which glass fibers and the like are blended, the molding shrinkage ratio tends to be small. Furthermore, as described above, in the resin in which the glass fibers and the like are blended, the molding shrinkage ratio in the flow direction is smaller than the molding shrinkage ratio in the vertical direction.

(3) Surface temperature of the mold: the molding shrinkage ratio of the resin varies depending on the surface temperature of the cavity of the mold during molding. Generally, with higher surface temperature, the molding shrinkage ratio tends to increase.

(4) The product of the holding pressure and the holding pressure time: the product of the magnitude of the holding pressure after resin filling and the pressure holding time also changes the molding shrinkage rate. Generally, with higher holding pressure and longer holding pressure time, the molding shrinkage ratio tends to decrease.

Next, before describing the design support device 20, machine learning for generating a learned model will be described.

<Machine Learning Device 30>

The machine learning device 30 acquires, for example, in advance, any molding condition in molding any article to be molded by any injection molding machine, as input data.

Furthermore, the machine learning device 30 acquires the molding shrinkage ratio in the flow direction and the molding shrinkage ratio in the vertical direction of the resin measured in the molded article molded with the molding conditions in the acquired input data, as a label (correct answer).

The machine learning device 30 performs supervised learning using training data which is a set of the label and the acquired input data, and constructs a learned model to be described later.

In so doing, it is possible for the machine learning device 30 to provide the constructed learned model to the design support device 20.

The machine learning device 30 will be described in detail.

The machine learning device 30 includes an input data acquiring unit 301, a label acquiring unit 302, a learning unit 303, and a storage unit 304, as shown in FIG. 1.

In the learning phase, the input data acquiring unit 301 acquires, as input data, any molding condition in any molded article by any injection molding machine via a communication unit (not shown), from an injection molding machine (not shown), a control device (not shown) for controlling the injection molding machine, or the like. Furthermore, the input data acquiring unit 301 may acquire the molding condition as input data in a case in which a molded article is injected in a trial with a molding condition set in advance using a trial mold designed by the CAD device 10. The input data acquiring unit 301 outputs the acquired input data to the storage unit 304.

The label acquiring unit 302 acquires, as label data (correct answer data), data indicating the molding shrinkage ratio in the flow direction, and the molding shrinkage ratio in the vertical direction, of the resin measured at the time of dimensional check when taking out the molded article molded with the molding conditions of the acquired input data from the mold. Furthermore, the label acquiring unit 302 may acquire, as label data (correct answer data), the molding shrinkage ratio in the flow direction and the molding shrinkage ratio in the vertical direction, measured at the time of dimensional check of the molded article in a case in which the molded article is injected in a trial with a molding condition set in advance using the trial product of the mold described above. The label acquiring unit 302 outputs the acquired label data to the storage unit 304.

It should be noted that the molding shrinkage ratio in the flow direction (or the vertical direction) can be calculated by comparing the size of each part of the molded article along the flow direction (or the vertical direction) with the size of each part of the mold.

The learning unit 303 receives the above-described set of the input data and the label as training data, and performs supervised learning using the received training data to thereby construct a learned model 250 that predicts the molding shrinkage ratio in the flow direction and the molding shrinkage ratio in the vertical direction of the resin on the basis of the molding condition set in advance.

Furthermore, the learning unit 303 provides the constructed learned model 250 to the design support device 20.

It should be noted that it is preferable to prepare a number of pieces of training data for performing supervised learning. For example, training data may be acquired from injection molding machines in various locations such as machines that are actually operating at the customer's plant, or from each of the control devices of the respective injection molding machines.

Figure 2:
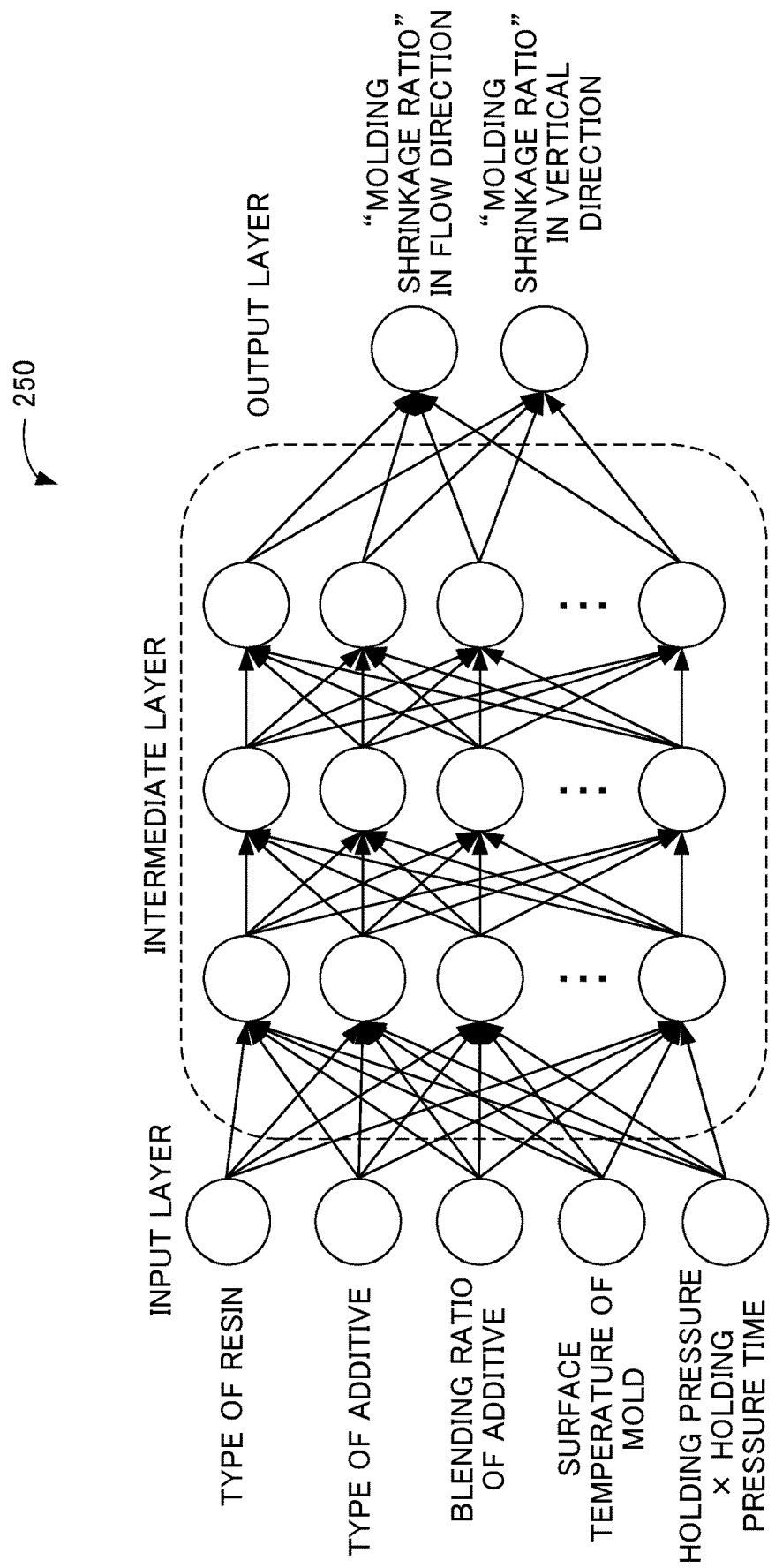
FIG. 2 is a diagram showing an example of a learned model provided to the design support device of FIG. 1.

FIG. 2 is a diagram showing an example of the learned model 250 provided to the design support device 20 of FIG. 1. Here, as shown in FIG. 2, the learned model 250 exemplifies a multilayer neural network in which the data indicating the "molding shrinkage ratio" in the flow direction and the "molding shrinkage ratio" in the vertical direction are used as output layers, with the molding conditions of the type of resin, the type of additive, the blending ratio of additive, the surface temperature of a mold, and the product of the holding pressure and the holding pressure time being used as input layers.

Furthermore, when new training data are acquired after the learned model 250 is constructed, the learning unit 303 may update the learned model 250 that has been constructed by performing further supervised learning for the learned model 250.

The supervised learning may be performed by online learning. Moreover, the supervised learning may be performed by batch learning. Furthermore, the supervised learning may be performed by mini-batch learning.

The online learning refers to a learning method in which injection molding by an injection molding machine (not shown) is carried out, and each time the training data are created, supervised learning is carried out instantaneously. In addition, the batch learning refers to a learning method in which injection molding by an injection molding machine (not shown) is carried out, and while the creation of the training data is repeated, a plurality of training data corresponding to the repetition is collected, and supervised learning is carried out using all the collected training data. Furthermore, the mini-batch learning refers to a learning method that is an intermediate method between the online learning and batch learning and in which supervised learning is performed whenever a certain amount of training data is collected.

The storage unit 304 is RAM (Random Access Memory) or the like, and stores input data acquired by the input data acquiring unit 301, the label data acquired by the label acquiring unit 302, and the learned model 250 constructed by the learning unit 303.

The machine learning for generating the learned model 250 included in the design support device 20 has been described above.

Next, a description will be given of the design support device 20 in the operation phase.

<Design Support Device 20 in Operation Phase>

As shown in FIG. 1, the design support device 20 in the operation phase includes an input unit 201, a prediction unit 202, an output unit 203, and a storage unit 204.

It should be noted that the design support device 20 includes an arithmetic processing device (not shown) such as a CPU in order to realize the operation of the functional block of FIG. 1. Moreover, the design support device 20 includes an auxiliary storage device (not shown) such as read only memory (ROM) or an HDD storing various control programs and a main storage device (not shown) such as RAM for storing data required temporarily for the arithmetic processing unit to execute programs.

Furthermore, in the design support device 20, the arithmetic processing unit reads the OS and application software from the auxiliary storage device, and executes arithmetic processing based on this OS and application software, while deploying the read OS and application software to the main storage device. The design support device 20 controls hardware components on the basis of the arithmetic processing result. In this way, the processes of the functional blocks shown in FIG. 1 are realized. That is, the design support device 20 can be realized by the cooperation of hardware and software.

The input unit 201 inputs a molding condition set in advance from the CAD device 10, for example, at the time of designing the mold by the CAD device 10 (or at the time of redesign). The input unit 201 outputs the inputted molding condition to the prediction unit 202.

The prediction unit 202 inputs the molding condition acquired from the input unit 201 into the learned model 250 of FIG. 2 to predict the molding shrinkage ratio in the flow direction and the molding shrinkage ratio in the vertical direction of the resin in a molded article designed in advance.

The output unit 203 may output the molding shrinkage ratio in the flow direction and the molding shrinkage ratio in the vertical direction predicted by the prediction unit 202 to an output device such as a liquid crystal display included in the CAD device 10 (not shown). It should be noted that the output unit 203 may perform outputting by audio through a speaker (not shown).

In so doing, it is possible for the CAD device 10 to design a mold by calculating the dimensions of the mold (cavity) on the basis of the CAD data of the molded article designed in advance, the molding conditions set in advance, and the predicted molding shrinkage ratio in the flow direction and the vertical direction. Thereafter, when the designed mold is manufactured in a trial, a trial injection using the designed mold is performed, and the molding shrinkage ratio in the flow direction and the molding shrinkage ratio in the vertical direction are measured at the time of dimensional check of the injected molded article. In this case, in the machine learning device 30, the input data acquiring unit 301 acquires the molding conditions set in advance as input data, and the label acquiring unit 302 acquires, as a label, the molding shrinkage ratio in the flow direction and the molding shrinkage ratio in the vertical direction measured. Thereafter, the learning unit 303 receives a set of the input data and the labels as new training data, and updates the learned model 250 by performing supervised learning.

It should be noted that, even if the molding condition set in advance is adjusted, and the molded article is injected in a trial using the same mold manufactured in a trial, the input data acquiring unit 301 may acquire the adjusted molding conditions as input data, and the label acquiring unit 302 may acquire, as a label, the molding shrinkage ratio in the flow direction and the molding shrinkage ratio in the vertical direction measured. The learning unit 303 may receive a set of the input data and the label as new training data and perform supervised learning, thereby updating the learned model 250.

Thereafter, in a case in which the mold is redesigned by the CAD device 10, the input unit 201 inputs molding conditions set in advance from the CAD device 10. The prediction unit 202 inputs the inputted molding conditions into the updated learned model 250 to thereby predict a new molding shrinkage ratio in the flow direction and a new molding shrinkage ratio in the vertical direction.

That is, the mold is designed by the CAD device 10, the designed mold is manufactured in a trial, the molded article is injected in a trial using the mold manufactured in a trial, and the molding shrinkage ratios of the flow direction and the vertical direction are measured at the time of dimensional check of the injected molded article in a trial. Thereafter, each time the series of procedures are repeated, the learned model 250 is updated. With such a configuration, since the accuracy of the molding shrinkage ratio in the flow direction and the molding shrinkage ratio in the vertical direction predicted by the design support device 20 using the learned model 250 is improved, it is possible to determine the final mold shape and the final molding condition with a small number of trial molds.

The storage unit 204 is, for example, ROM or an HDD, and may store the learned model 250 together with various control programs.

<Prediction Processing of Prediction Device 20 in Operation Phase>

Next, a description will be given of an operation related to a prediction processing of the design support device 20 according to the present embodiment.

Figure 3:
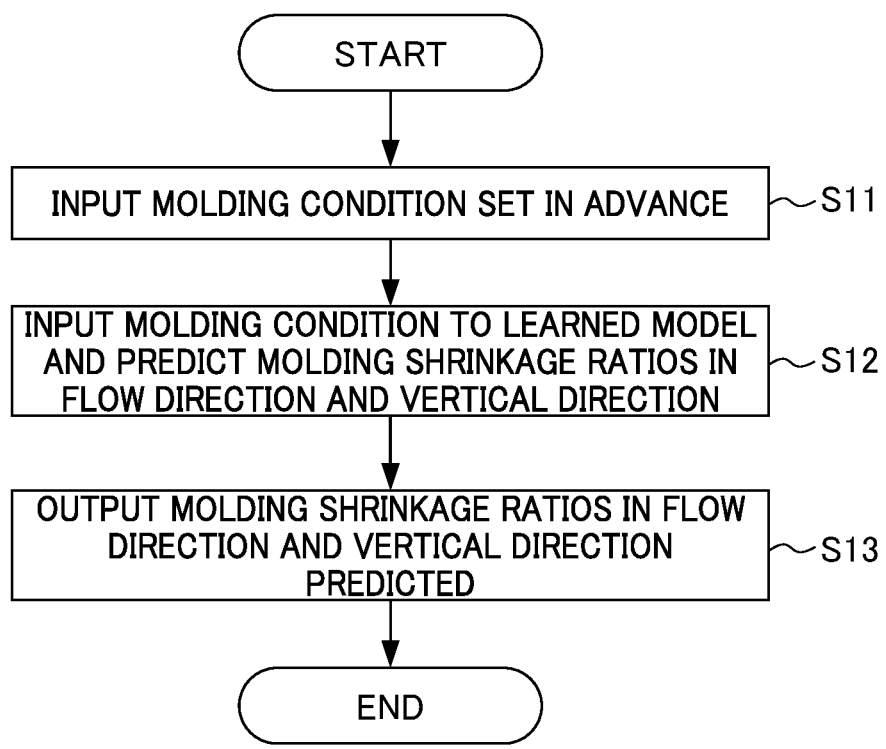
FIG. 3 is a flowchart explaining prediction processing of the design support device in an operation phase.

FIG. 3 is a flowchart for explaining the prediction processing of the design support device 20 in the operation phase.

In Step S11, the input unit 201 inputs molding conditions set in advance from the CAD device 10 at the time of designing (or at the time of redesigning) a mold by the CAD device 10.

In Step S12, the prediction unit 202 inputs the molding condition inputted in Step S11 into the learned model 250 to thereby predict the molding shrinkage ratio in the flow direction and the molding shrinkage ratio in the vertical direction of the resin in a molding article designed in advance.

In Step S13, the output unit 203 outputs the molding shrinkage ratios in the flow direction and the vertical direction predicted in Step S12, to the CAD device 10.

Thus, it is possible for the design support device 20 according to one embodiment to predict the molding shrinkage ratio according to the molding condition by inputting the molding conditions set in advance to the learned model 250 at the time of designing (or at the time of redesigning) the mold of the molded article designed in advance.

Furthermore, the design support device 20 outputs to the CAD device 10 the molding shrinkage ratios in the flow direction and the vertical direction predicted, which thereby makes it possible for the CAD device 10 to design the mold on the basis of the CAD data of the molded article designed in advance, the molding conditions set in advance, and the molding shrinkage ratios in the flow direction and the vertical direction predicted. Furthermore, each time procedures such as the manufacture of a mold in a trial, the injection of a molded article in a trial using a mold manufactured in a trial, the size measurement of the injected molded article in a trial, and the redesign of a mold are repeatedly performed, the learned model 250 is updated by the machine learning device 30. With such a configuration, since the accuracy of the molding shrinkage ratio in the flow direction and the molding shrinkage ratio in the vertical direction predicted by the design support device 20 using the learned model 250 is improved, it is possible to reduce the number of trial molds, and thus, it is possible to reduce the cost of the molded article. Furthermore, it is also possible to reduce the time cost for the injection in a trial using the mold manufactured in a trial.

Furthermore, in the design support device 20, using the learned model 250 eliminates the need for an operator to predict the molding shrinkage ratio in the flow direction and the vertical direction of the resin in the designed molded article, thereby making it possible to reduce the burden on the operator.

Although an embodiment has been described above, the design support device 20 and the machine learning device 30 are not limited to the above-described embodiment, and include modifications, improvements, and the like to the extent that an object of the present invention can be achieved.

MODIFICATION EXAMPLE 1

In the above-described embodiment, the machine learning device 30 is exemplified as a device different from the CAD device 10 and the design support device 20. However, the CAD device 10 or the design support device 20 may include some or all of the functions of the machine learning device 30.

MODIFICATION EXAMPLE 2

For example, in the above-described embodiment, although the design support device 20 is exemplified as a device different from the CAD device 10, the CAD device 10 may include some or all of the functions of the design support device 20.

Alternatively, the server may include, for example, some or all of the input unit 201, the prediction unit 202, the output unit 203, and the storage unit 204 of the design support device 20. Furthermore, the functions of the design support device 20 may be realized using a virtual server function or the like on a cloud.

Moreover, the design support device 20 may be a distributed processing system in which each function of the design support device 20 is distributed to a plurality of servers appropriately.

MODIFICATION EXAMPLE 3

Furthermore, for example, in the above-described embodiment above, the molding condition set in advance includes the type of resin (material) (thermosetting resin such as epoxy resin or thermoplastic resin such as polyester), the type of additive (glass fiber, stabilizer, coloring agent, or the like), the blending ratio of the additive, the surface temperature of a mold, and the product of the holding pressure and the holding pressure time. However, the present invention is not limited thereto.

For example, although the product of the holding pressure and the holding pressure time is set in consideration of the cooling time after resin filling, the molding condition may include the cooling time as an independent parameter, together with the product of the holding pressure and holding pressure time.

Furthermore, although the surface temperature of the mold is set in consideration of the cooling rate after resin filling, the molding conditions may include a cooling rate as independent parameters together with the surface temperature of the mold.

Furthermore, the molding condition may also include information of the wall thickness of the molded article indicated by the CAD data of the molded article designed in advance.

MODIFICATION EXAMPLE 4

Figure 4:
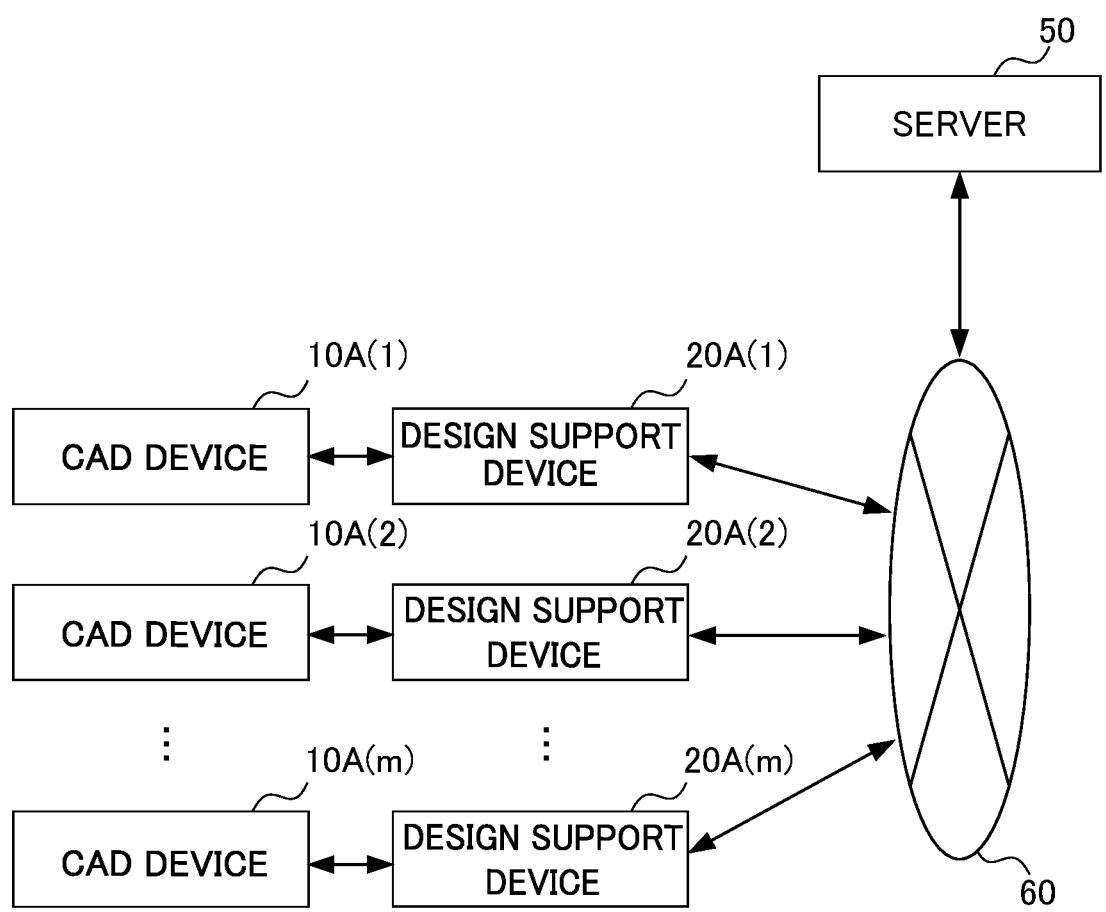
FIG. 4 is a diagram showing an example of the configuration of the design support system.

For example, in the above-described embodiment, the design support device 20 predicts the molding shrinkage ratio in the flow direction and the vertical direction of the resin on the basis of the molding condition acquired from one CAD device 10 using the learned model 250 provided from the machine learning device 30. However, the present invention is not limited thereto. For example, as shown in FIG. 4, a server 50 may store the learned model 250 generated by the machine learning device 30 and may share the learned model 250 with m-number of design support devices 20A(1) to 20A(m) connected to a network 60 (m is an integer of 2 or more). This allows the learned model 250 to be applied even when new CAD devices and design support devices are installed.

It should be noted that each of the design support devices 20A(1) to 20A(m) is connected to each of the CAD devices 10A(1) to 10A(m).

Furthermore, each of the CAD devices 10A(1) to 10A(m) corresponds to the CAD device 10 of FIG. 1. Each of the design support devices 20A(1) to 20A(m) corresponds to the design support device 20 of FIG. 1.

Figure 5:
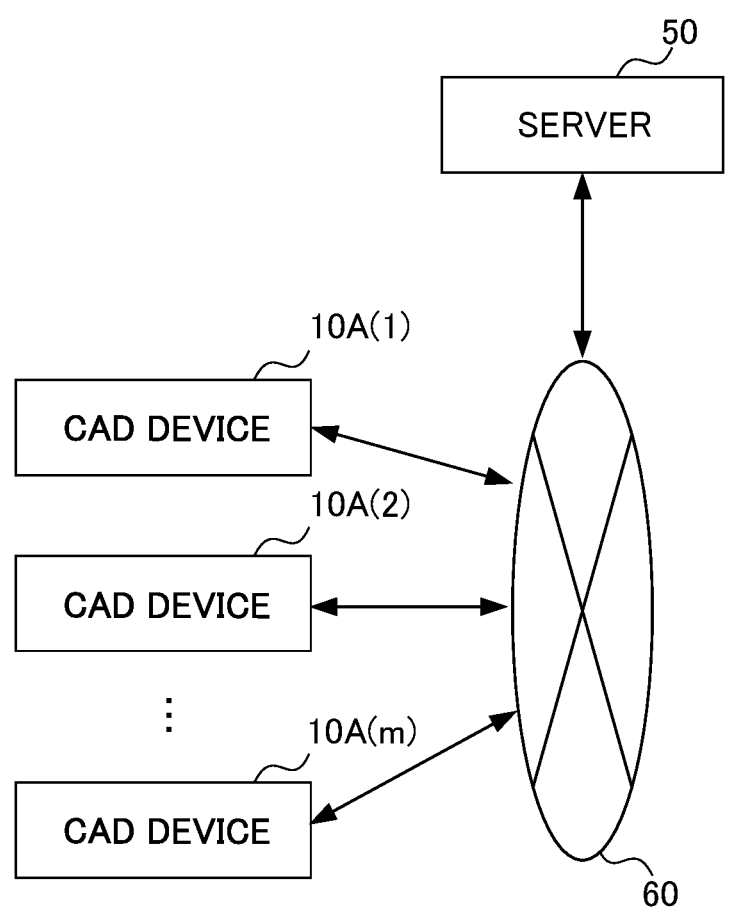
FIG. 5 is a diagram showing an example of the configuration of the design support system.

Alternatively, as shown in FIG. 5, the server 50, for example, may operate as the design support device 20, for each of the CAD devices 10A(1) to 10A(m) connected to the network 60, and may predict the molding shrinkage ratios in the flow direction and the vertical direction on the basis of the acquired molding condition. This allows the learned model 250 to be applied even when new CAD devices are installed.

It should be noted that, in one embodiment, each function included in the design support device 20 and the machine learning device 30 may be realized by hardware, software, or a combination thereof. Here, being realized by software indicates being realized by a computer reading and executing a program.

Each component included in the design support device 20 and the machine learning device 30 may be implemented by hardware including electronic circuits, or the like, software, or a combination thereof. If implemented by software, the programs that make up this software are installed to the computer. In addition, these programs may also be recorded on removable media and distributed to the user or downloaded to the user's computer over a network. Furthermore, when configured by hardware, a part or all of the functions of each component included in the above-described devices can be constituted by an integrated circuit (IC) such as, for example, a ASIC (Application Specific Integrated Circuit), a gate array, an FPGA (Field Programmable Gate Array), a CPLD (Complex Programmable Logic Device), or the like.

The programs can be stored on any of various types of non-transitory computer readable media and provided to a computer. The non-transitory computer readable media include various types of tangible storage media. Examples of the non-transitory computer readable media include a magnetic recording medium (for example, a flexible disk, a magnetic tape, and a hard disk drive), a magneto-optical recording medium (for example, a magneto-optical disk), CD-ROM (Read Only Memory), CD-R, CD-R/W, semiconductor memory (for example, mask ROM, PROM (Programmable ROM), EPROM (Erasable PROM), flash ROM, and RAM (Random Access Memory)). The programs may be provided to a computer by using any of various types of transitory computer readable media. Examples of the transitory computer readable media include electric signals, optical signals, and electromagnetic waves. A transitory computer readable medium can provide programs to a computer through a wired communication path such as an electrical cable, an optical fiber, or the like, or through a wireless communication path.

A step of writing programs to be recorded on a recording medium includes processing that is performed in a time series manner according to the order and processing that is performed in a parallel or independent manner even if the processing is not necessarily performed in a time series manner.

In other words, the machine learning device and the design support device of the present disclosure can assume various embodiments having the following configurations.

(1) The machine learning device 30 of the present disclosure includes: an input data acquiring unit 301 that acquires input data including any molding condition including at least a type of resin, a type of additive, a blending ratio of the additive, a surface temperature of a mold, and a product of a holding pressure and a holding pressure time for any article molded by any injection molding machine; a label acquiring unit 302 that acquires label data indicating a molding shrinkage ratio in a flow direction and a molding shrinkage ratio in a vertical direction perpendicular to the flow direction of a resin measured of the article molded at the molding condition included in the input data; and a learning unit 303 that executes supervised learning using the input data acquired by the input data acquiring unit 301 and the label data acquired by the label acquiring unit 302, and generates a learned model 250.

According to the machine learning device 30, it is possible to generate the learned model 250 that predicts the molding shrinkage ratios in the flow direction and the molding shrinkage ratio in the vertical direction in the molded article.

(2) The design support device 20 includes: a learned model 250 generated by a machine learning device 30 according to claim 1; an input unit 201 that inputs a molding condition set in advance; and a prediction unit 202 that inputs the molding condition inputted by the input unit 201 to the learned model 250, and predicts a molding shrinkage ratio in the flow direction and a molding shrinkage ratio in the vertical direction at the molding condition.

According to the design support device 20, it is possible to predict the molding shrinkage ratio in the molded article to be molded with a mold to be designed in the design of the mold.

(3) The learned model 250 may be provided in a server 50 connected so as to be accessible from the design support device 20 via a network 60.

This allows the learned model 250 to be applied even when new CAD devices 10 and design support devices 20 are installed.

(4) It may be configured to include a machine learning device 30.

With such a configuration, it is possible to exhibit advantageous effects similar to any of (1) to (3) described above.

EXPLANATION OF REFERENCE NUMERALS

10 CAD device
20 design support device
201 input unit
202 prediction unit
250 learned model
30 machine learning device
301 input data acquiring unit
302 label acquiring unit
303 learning unit
50 server

What is claimed is:

1. A machine learning device comprising:
a non-transitory memory configured to store a program; and
a hardware processor configured to execute the program and control the machine learning device to:
acquire input data including molding conditions of at least a type of resin, a type of additive, a blending ratio of the additive, a surface temperature of a mold, and a product of a holding pressure and a holding pressure time for any article molded by any injection molding machine;
acquire label data indicating a molding shrinkage ratio in a flow direction and a molding shrinkage ratio in a vertical direction perpendicular to the flow direction of a resin measured of the article molded at the molding condition included in the input data; and
execute supervised learning using the input data acquired and the label data acquired, and generate a learned model.

2. A design support device comprising:
a learned model generated by a machine learning device according to claim 1;
a non-transitory memory configured to store a program; and
a hardware processor configured to execute the program and control the design support device to:
input a molding condition set in advance; and
input the molding condition input to the learned model, and predict a molding shrinkage ratio in the flow direction and a molding shrinkage ratio in the vertical direction at the molding condition.

3. The design support device according to claim 2, wherein
the learned model is provided in a server connected so as to be accessible from the design support device via a network.

4. A system including a machine learning device and a design support device including a learned model generated by the machine learning device,
the machine learning device comprising:
a non-transitory memory configured to store a program; and
a hardware processor configured to execute the program and control the machine learning device to:
acquire input data including molding conditions of at least a type of resin, a type of additive, a blending ratio of the additive, a surface temperature of a mold, and a product of a holding pressure and a holding pressure time for any article molded by any injection molding machine;
acquire label data indicating a molding shrinkage ratio in a flow direction and a molding shrinkage ratio in a vertical direction perpendicular to the flow direction of a resin measured of the article molded at the molding condition included in the input data; and
execute supervised learning using the input data acquired and the label data acquired, and generate a learned model, and
the design support device comprising:
a non-transitory memory configured to store a program; and
a hardware processor configured to execute the program and control the design support device to:
input a molding condition set in advance; and input the molding condition input to the learned model, and predict a molding shrinkage ratio in the flow direction and a molding shrinkage ratio in the vertical direction at the molding condition.

* * * * *